D. W. SHIEK.
COMPUTING MACHINE.
APPLICATION FILED NOV. 13, 1907.

1,143,447.

Patented June 15, 1915.
9 SHEETS—SHEET 1.

D. W. SHIEK.
COMPUTING MACHINE.
APPLICATION FILED NOV. 13, 1907.

1,143,447.

Patented June 15, 1915.
9 SHEETS—SHEET 3.

Witnesses:

Inventor:
Daniel W. Shiek
By Hill & Hill
Attys.

D. W. SHIEK.
COMPUTING MACHINE.
APPLICATION FILED NOV. 13, 1907.
1,143,447.
Patented June 15, 1915.
9 SHEETS—SHEET 4.
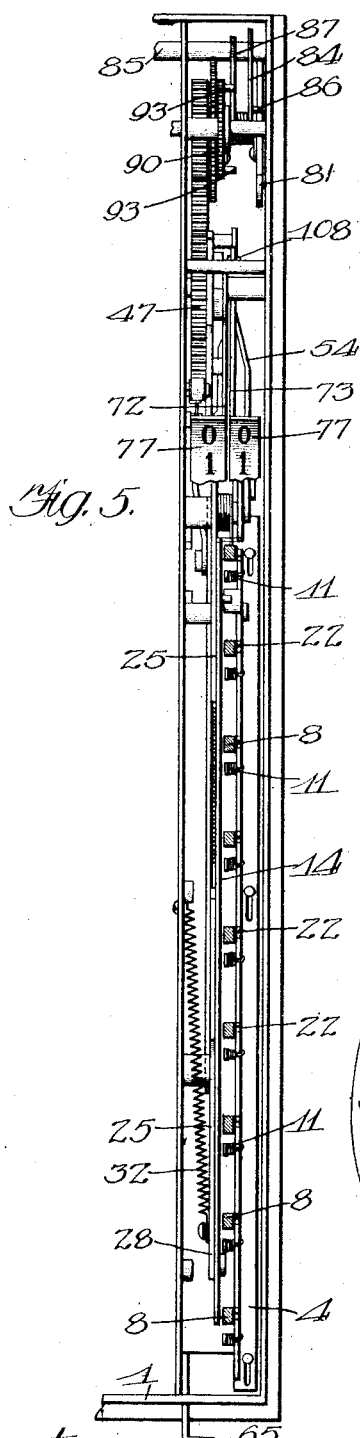
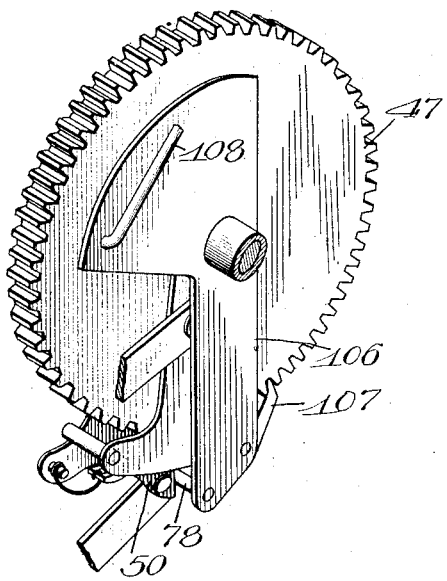
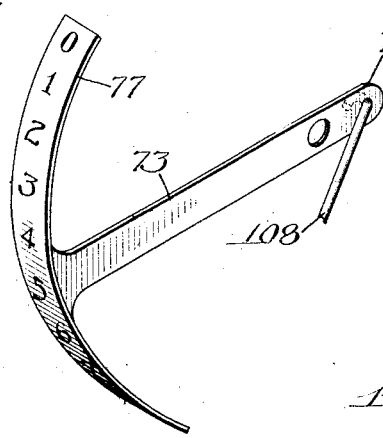
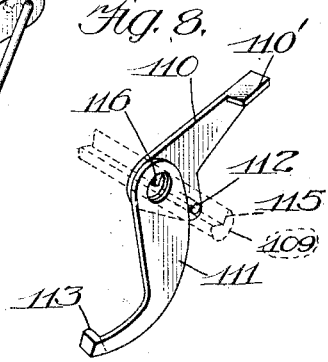

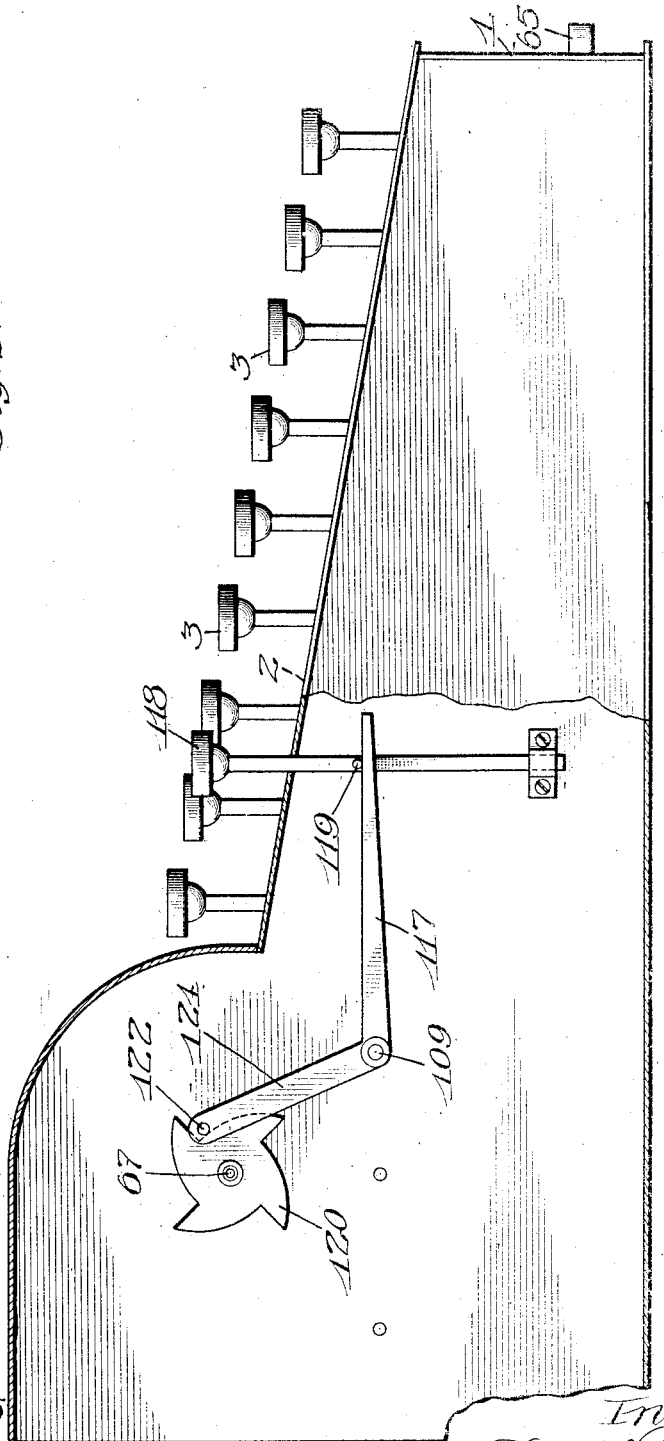

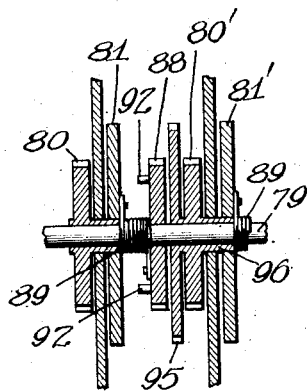
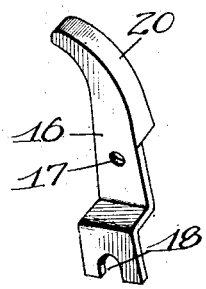
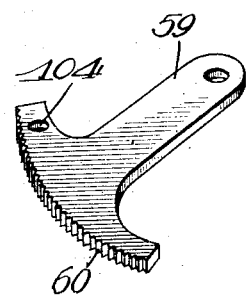
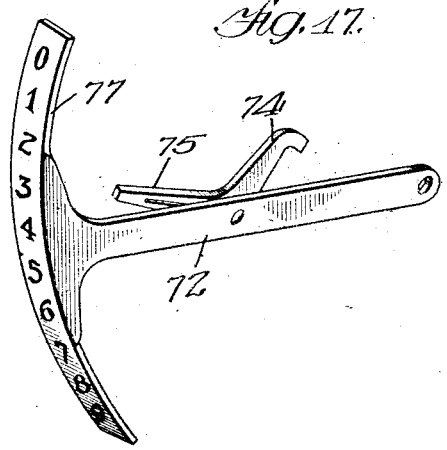

D. W. SHIEK.
COMPUTING MACHINE.
APPLICATION FILED NOV. 13, 1907.

1,143,447.

Patented June 15, 1915.
9 SHEETS—SHEET 9.

Witnesses:
Ira D. Perry
Robert H. Weir

Inventor:
Daniel W. Shiek
By Hill & Hill
Attys.

UNITED STATES PATENT OFFICE.

DANIEL W. SHIEK, OF INDIANAPOLIS, INDIANA, ASSIGNOR TO WALTER L. MILLIKEN, OF BARNSTABLE, MASSACHUSETTS.

COMPUTING-MACHINE.

1,143,447.  Specification of Letters Patent.  Patented June 15, 1915.

Application filed November 13, 1907. Serial No. 402,010.

*To all whom it may concern:*

Be it known that I, DANIEL W. SHIEK, a citizen of the United States, residing at Indianapolis, in the county of Marion and State of Indiana, have invented certain new and useful Improvements in Computing-Machines, of which the following is a description.

My invention belongs to that general class of devices known as computing or adding machines in which the usual simple computations may be mechanically performed by the operation of the keys or levers of the device.

The object of my invention is to provide a simple, durable and accurate machine of the kind described, that may be easily manipulated with a minimum expenditure of energy.

To this end my invention consists in the novel construction, arrangement and combination of parts herein shown and described and more particularly pointed out in the claims.

Figure 1:
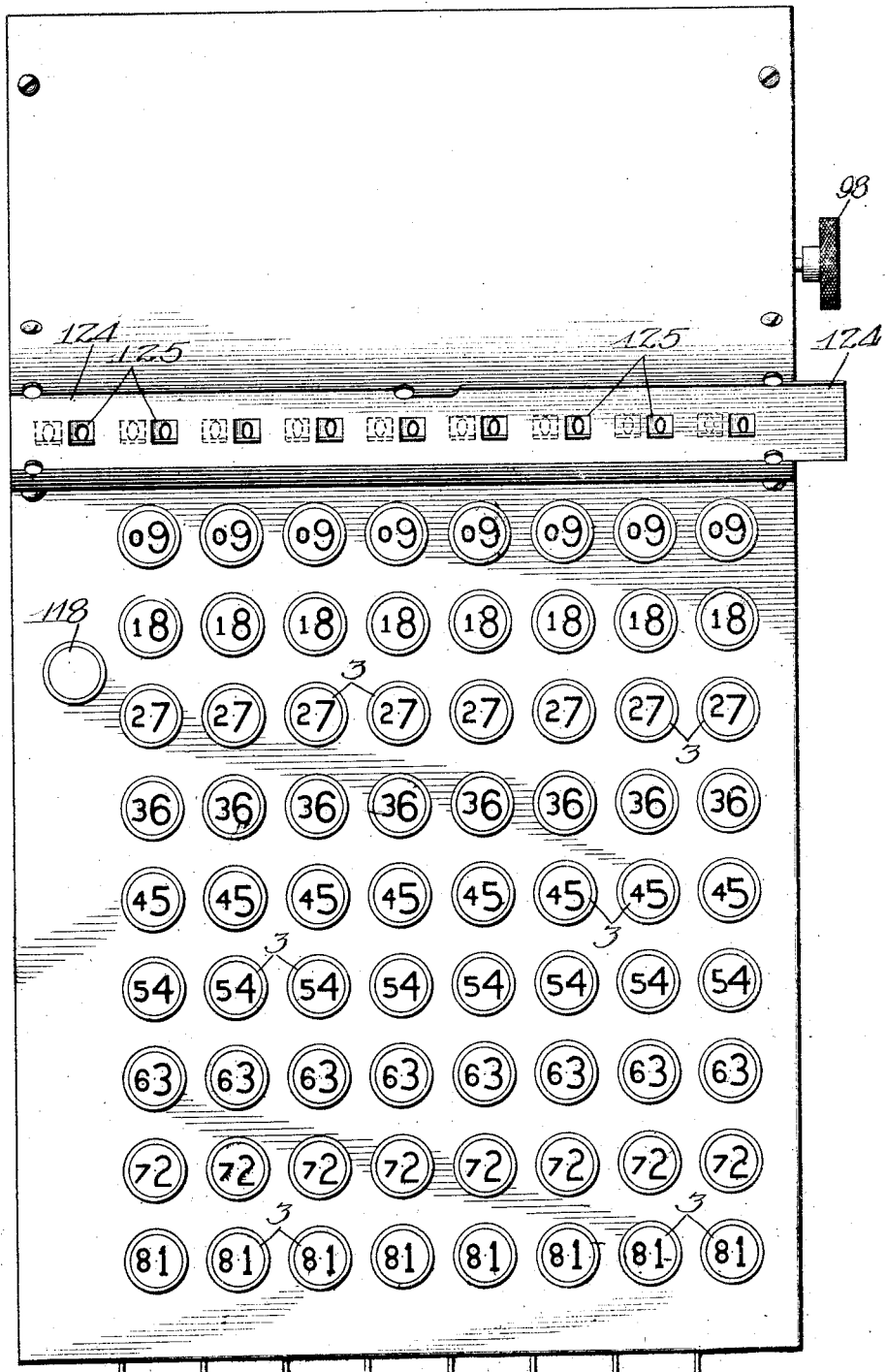
Figure 2:
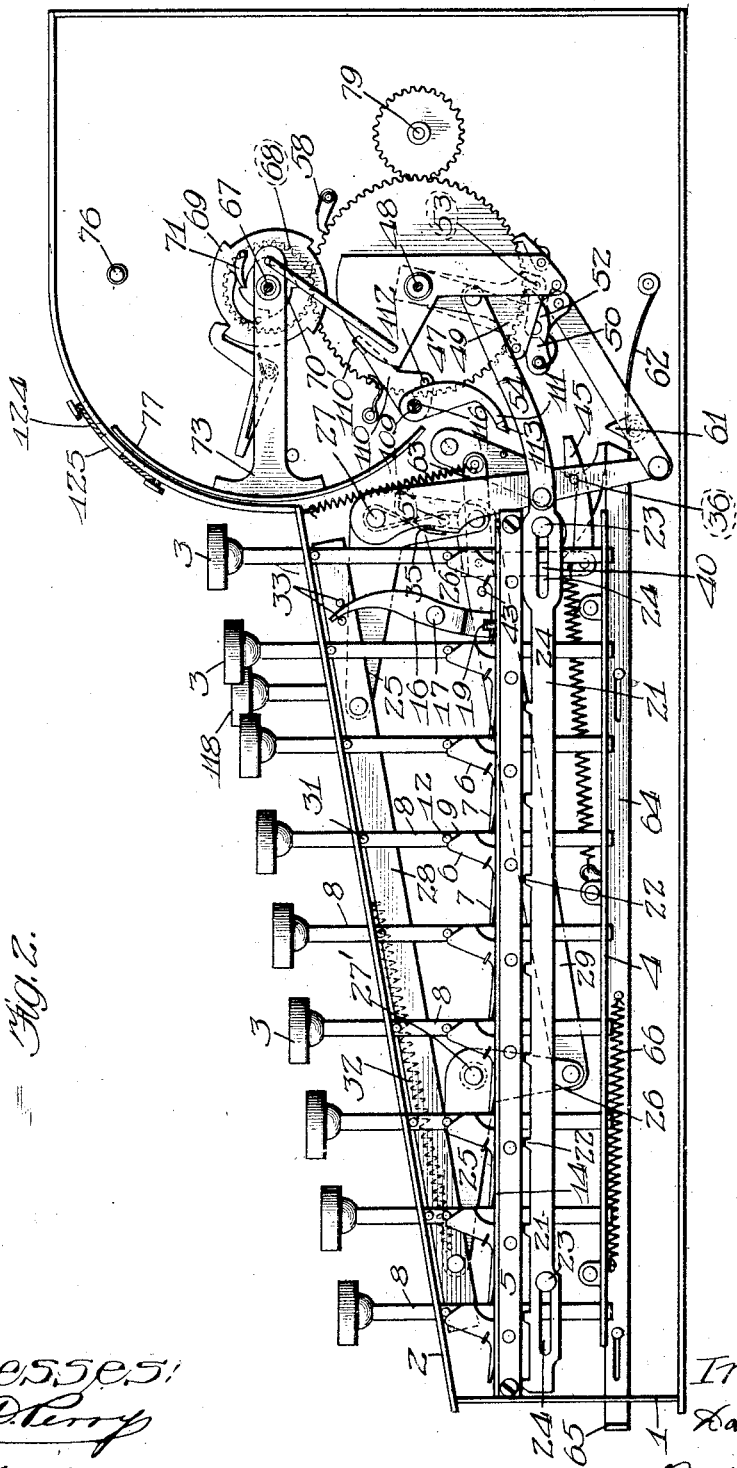
Figure 3:
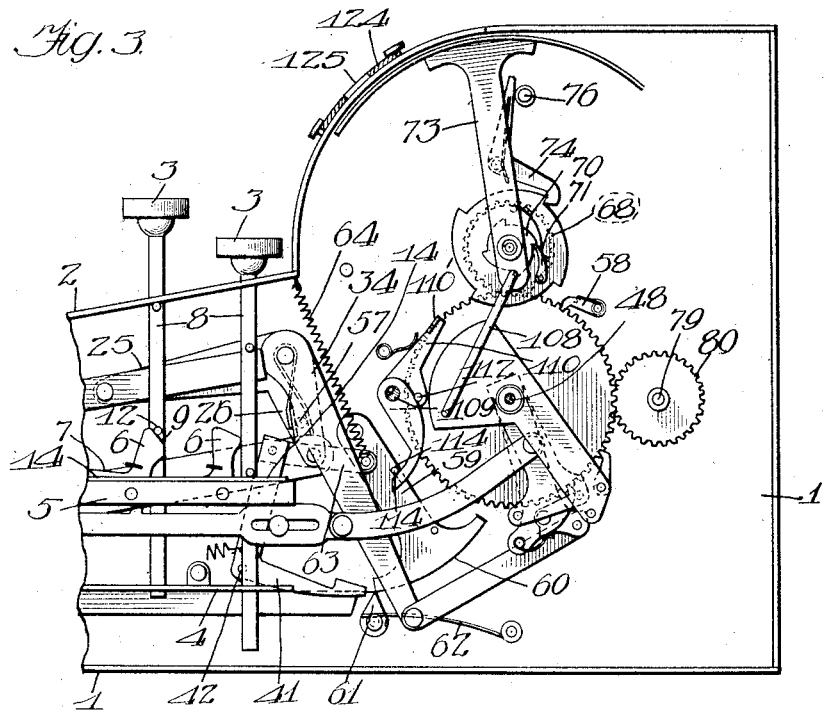
Figure 4:
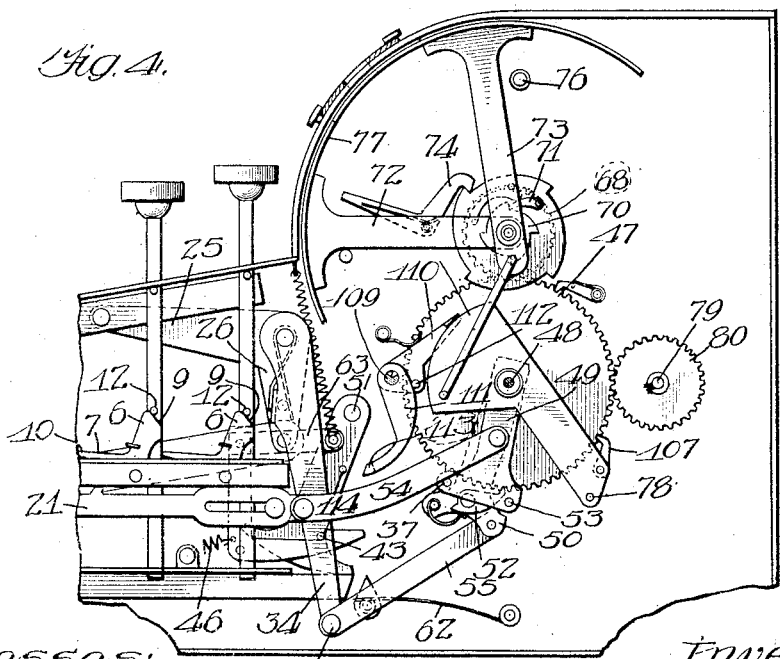
Figure 10:
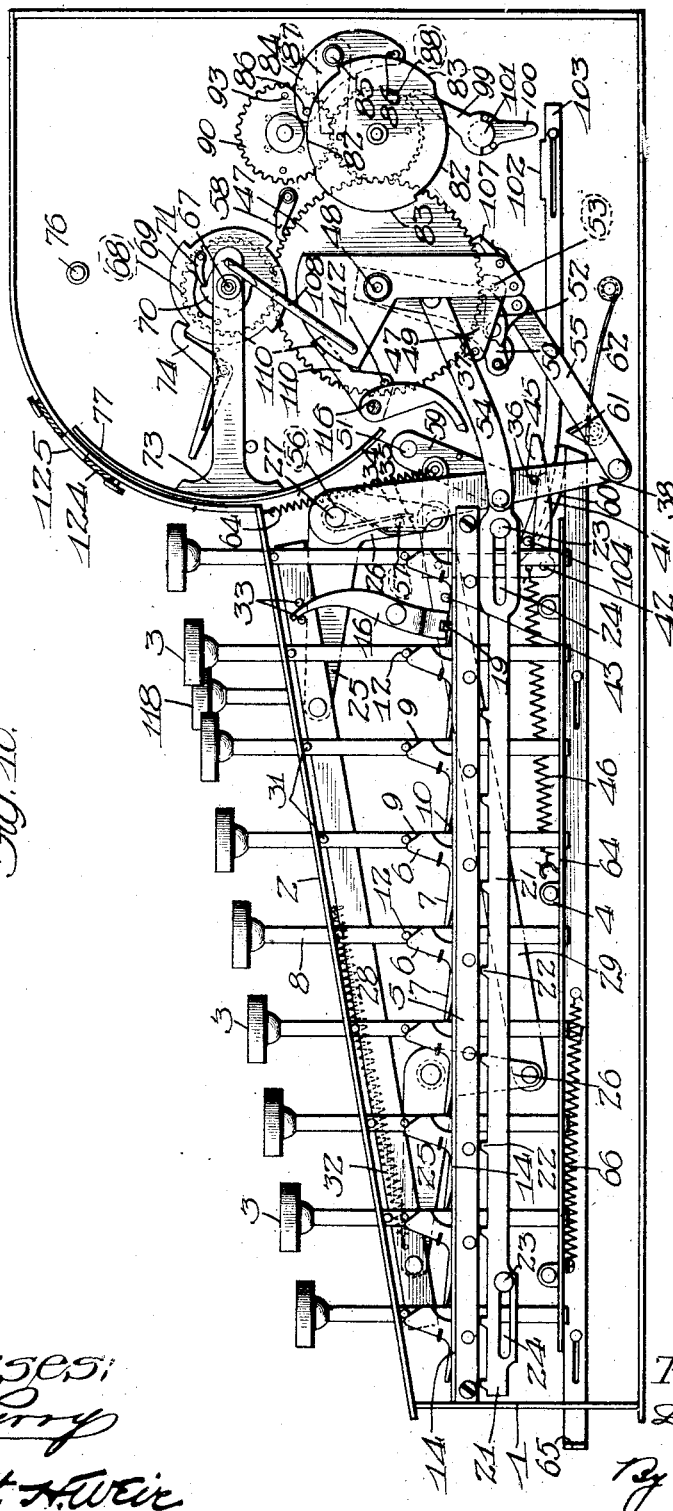
Figure 11:
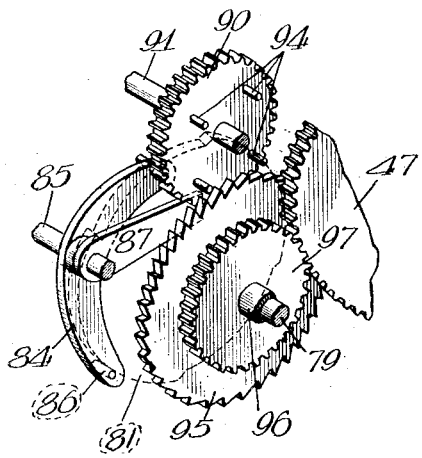
Figure 12:
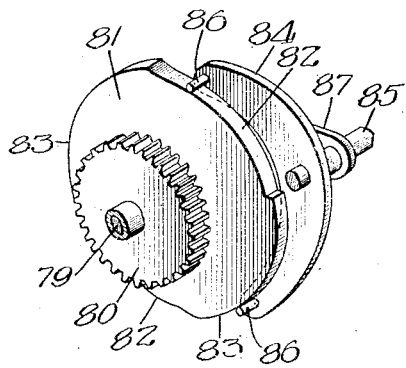
Figure 13:
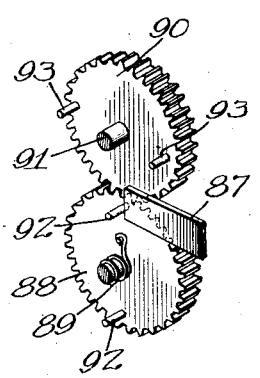
Figure 18:
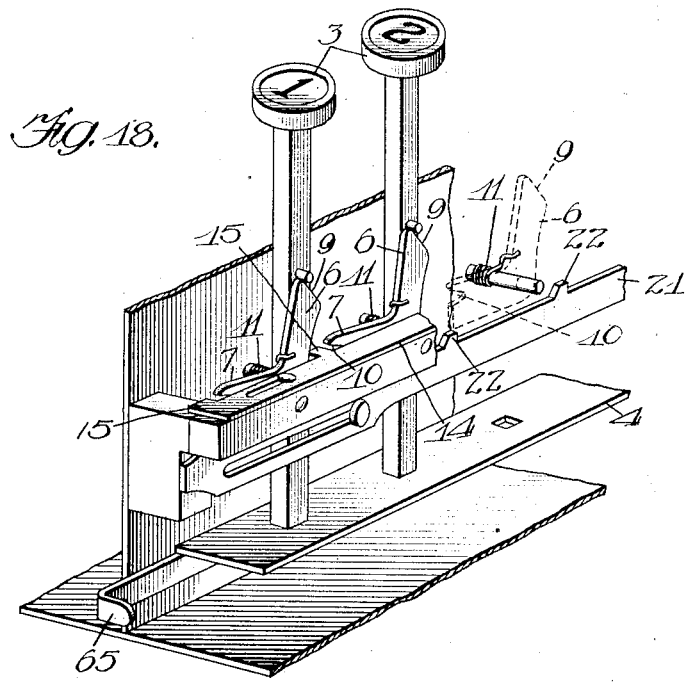
Figure 19:
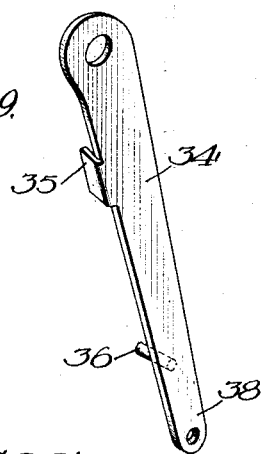
Figure 20:
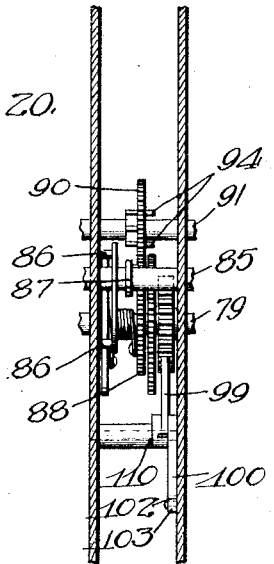

In the accompanying drawings wherein like or similar reference characters indicate like or corresponding parts, Figure 1, is a plan view of my device. Fig. 2, is a vertical longitudinal section of the same. Fig. 3, is a section taken substantially on the same line as Fig. 2 and showing a portion of my device with the parts in position to adjust the indicator when a key is being operated. Fig. 4, is a view similar to Fig. 3 showing the position of the parts with the key released and returned to its normal position. Fig. 5 is an inclined horizontal sectional view of one of the key numerical orders taken just below the upper casing. Figs. 6, 7 and 8 are perspective details of portions of my device. Fig. 9, is a side elevation of my device with parts removed or broken away to more clearly show the construction. Fig. 10, is a longitudinal section showing the coöperating parts of a section of keys other than the first or units section. Fig. 11, is a perspective detail view of a portion of the escapement mechanism employed in the carrying operation. Figs. 12 and 13 are perspective details of portions of the carrying mechanism. Fig. 14, is a sectional detail of the carrying mechanism. Figs. 15, 16 and 17 are perspective details of my device. Fig. 18, is a fragmentary perspective view, showing the key and stop mechanism. Fig. 19, is a perspective detail. Fig. 20, is a rear view of a portion of the escapement mechanism employed in the carrying operation.

In the preferred form shown in the drawings 1, is a suitable frame provided with a keyboard 2 and a series of keys 3, 3, for each numerical order within the capacity of the machine. The keys are each vertically movable and are guided at their lower ends by a plate 4 through which they loosely extend. The shanks 8 of the keys are square or otherwise formed to prevent their turning in their guides. Below the keys, is positioned a horizontal bar 5 upon which is mounted a series of bell crank levers 6—7, or equivalent parts pivotally connected at the angles of their arms to the bar. (See Fig. 2). One arm of each of the levers, as 6, is substantially vertical while the other arm 7 extends in a horizontal direction. The arm 6 is provided with a cam face 9, while the free end of the arm 7 is notched, forked, or equivalently formed, as at 10 for a purpose hereinafter to be described. A spring 11 tends to maintain the levers 6—7, in their normal positions. The number of bell crank levers in each series corresponds to the number of keys in each series or numerical section, there being in each a key for each numeral from 1 to 9 inclusive. Each key shank 8 is provided with a pin 12 or other part so positioned that in the operation of the key the pin will contact with the cam face 9 and rock the coöperating bell crank lever 6—7 on its pivotal support. A bar 14 is slidably mounted on the bar 5 and provided with a pin or projection 15 for each lever 6—7. Each projection 15 is arranged to normally register with the notch or groove 10 in the end of its particular arm 7.

A lever 16 is pivotally supported upon the frame between its ends, as at 17, and at its lower end engages the sliding bar 14. As shown, the end of the lever 16 is slotted as at 18 and loosely engages a pin 19 or other suitable means on the bar 14. The upper end of the lever 16 is provided with an inclined or cam faced lateral projection as at 20, adapted to be operated by the engagement of a movable part therewith as hereinafter described.

A longitudinally movable bar 21 is positioned below and in the same vertical plane with the bell crank levers 6—7. The bar 21 is provided with a series of shoulders or stops 22 or equivalent means, corresponding to the number of levers 6—7. Each stop is positioned to permit a regular gradual increase in the allowed travel of the bar 21 from the shortest to the longest distances, regulated by the position of the keys from 1 to 9 respectively. That is to say, the distance traveled by the bar 21 depends upon the particular key operated, and is regularly increased from the first to the ninth keys inclusive. As shown, the bar 21 is supported upon the frame by pins 23 loosely positioned in slots 24 in the bar, permitting the desired movement.

Two similarly formed bell crank levers 25—26, are provided for each series of keys and pivotally supported near their angles upon transverse shafts 27—27$^1$ respectively. (See Fig. 2.) The corresponding arms 25—25 carry a connecting bar 28 pivotally attached to each, while the arms 26—26 carry a similar bar 29. Any transverse or downward movement of the bar 28 will thus be transmitted to the bar 29, which will be given a combined vertical and longitudinal movement by reason of the swinging of the arms 26 on their pivotal supports. The bar 28 is also given a longitudinal movement in the opposite direction at the same time and for the same reason. Each key stem or shank 8 is provided with a horizontally projecting pin 31 or other suitable means just above the bar 28, so arranged that as a key is depressed the pin 31 engages the bar, which is thus depressed, operating the bar 29 and associated parts. A spring 32 or equivalent means is attached to one of the arms 25 and extends to a fixed part of the machine and serves to return the several parts, including the key to their normal positions when unrestrained. The bar 28 also carries a pair of projecting pins 33—33 suitably spaced from one another, and positioned to engage the opposite sides of the cam 20. As the bar 28 is depressed therefore the upper end of the lever 16 is thrown forward while the lower end is forced in the opposite direction moving the sliding bar 14 longitudinally. Upon the initial movement of a key, the pin 12 engages the cam face 9 of the bell crank lever 6—7, coöperating with that particular key, oscillating the lever sufficiently to carry the upper surface of the arm 7 below the coöperating projection 15. The pin 31 at the same time contacts with the bar 28 and forces the same downward. The several parts are suitably formed however, to insure the desired movement of the bell crank lever 6—7 before the bar 14 is moved sufficiently to engage the same.

When a key is operated the projection 15 corresponding to that particular key passes above the top of the arm 7, while the several other projections 15 engage the notches 10 in the ends of the arms 7 of the other levers, positively locking them in position and preventing the operation of another key until the key previously operated, together with all the associated parts, resume their normal positions. After the operations above described, the key being operated continues its downward travel, moving the bars 28 and 29 and their associated and coöperating parts as will be hereinafter described. A bar 34 is pivotally mounted at one end upon the shaft 27 with its free end 38 extending downward as shown, and is provided with two lateral projections 35 and 36. A bell crank 40—41 is pivotally mounted upon a fixed part of the machine near its angle, as at 42, with its arm 40 extending upward in the path of a pin or projection 43 on the bar 29. The other arm 41 extends substantially horizontally and is provided with a latch 45 adapted to engage the projection 36 and retain the bar 34 in its normal position. A spring 46 extends from the arm 40 to a fixed part of the device and tends to retain the latch in its normal position (see Fig. 2).

A gear or cog-wheel 47 is loosely mounted on a shaft 48 at the rear of lever 34. An arm 49 and a pawl bar 50 are also loosely mounted upon the same shaft. The free end of the bar 50 is provided with a spring pawl 52 arranged to engage the periphery of the cog-wheel. The arm 49 is provided with a pin 53 extending transversely across the plane of the cog-wheel in proximity to the pawl 52 and is connected by a link 54 or other suitable means to the stop bar 21. A second link 55 connects the free end of the bar 34 with the free end of the pawl lever 50. A second pin 37 or equivalent means is provided upon the arm 49 in position to engage the bar 50 so that on the return of the bar 34 to its normal position the arm 50 will contact with the pin 37 and carry the arm 49 and the stop bar 21 back to their normal positions. It is obvious that as described the gear or cog-wheel 47, in addition to its functions as a driving gear, also serves as a ratchet wheel for the actuating pawl 52. It is also clear that if preferred a ratchet wheel may be mounted so as to rotate with, and thus actuate the gear 47, the pawl 52 engaging the ratchet wheel for this purpose. In order to economize space and dispense with unnecessary parts, however, the form shown is preferred, the gear 47 having both functions.

A coiled spring 56 is loosely mounted on the shaft 27, with its ends extended and crossed with one end positioned in front of the projection 35 of the bar 34 and the other in the rear of a lateral pin 57 on the bell crank arm 26. It will thus be seen that upon depressing a key as before explained the arm 26 will be swung backward on its pivot, while the pin 57 carries one end of the spring 56 rearwardly. The latch 43 however, firmly holds the arm 34 in its normal position and since the other end of the spring 56 is positioned in front of the extension 25 on the arm, the movement of the arm 26 necessarily tensions the spring. As the key and connected parts continue to move, the pin 43 on the bar 29 contacts with the arm 42 of the latch lever swinging the same forward on its pivotal support and disengaging the latch 45 from the projection 36, when the tension of the spring 56 swings the arm 34 with its connected parts rearward as far as permitted by the stop bar 21, which as before explained, is controlled by the particular key operated. This movement first moves the pawl 52 forward slightly until it contacts with the pin 53, at which point the arm 49 and bar 51 move together. This positive engagement of the pawl with its cog-wheel, and the movement of the levers, rotates the cog-wheel 47 the fixed distance permitted, at which point it is brought to a positive stop by the wedging action of the pawl between the periphery of the cog-wheel and the pin 53. This action effectually prevents any possible overthrow of the parts caused by striking the keys with too much force. Upon releasing the key the spring 32 serves to promptly return all the parts to their normal positions. A pawl 58 engaging the cog-wheel 47 prevents backward rotation thereof and the cog-wheel is thus held at the exact point of rotation permitted by the particular key operated. By this means the cog-wheel is progressively rotated in one direction only, by the successive operation of the keys.

To insure accuracy it is desirable that when a key is once initially depressed or operated, it cannot return to its normal position until its stroke is completed or special steps are taken to release it. Any preferred means may be employed for this purpose. As shown in the drawings, a bar 59 is pivotally connected at one end of the frame as at 51 and is provided with a segment 60 at its free end. A coöperating double acting pawl 61 is arranged to engage the segment to prevent a reverse movement until it has reached its limit of movement in either direction. The length of the segment is such that it escapes from the pawl at either limit of its movement. A spring 62 resiliently maintains the pawl in operative position. A link 63 connects the bar 59 with the operating bar 29, so that a slight movement of any key in a section will move the segment and prevent the release of the key until it completes its full stroke. A spring 64 is connected at one end of the bar 59 and at the other end to a fixed part of the machine, and tends to retain the bar 59 and all the parts connected thereto in their normal positions.

In order to release a key that has been partially depressed accidentally without completing its stroke, I prefer to position a sliding bar 64 with one end in line with, and in proximity to, the pawl 61 and the other slightly extending from the front of the machine and preferably bent at a right angle as at 65 or otherwise arranged for convenience in operating the same. A spring 66, resiliently holds the bar in its normal position. By forcing the bar longitudinally, its inner end contacts with the pawl 61 and forces it out of engagement with the segment 60 permitting the various parts to return to their normal positions without effecting the registering mechanism.

A shaft 67 is loosely supported in the frame in proximity to the gear 47 with a pinion 68 loosely mounted thereon meshing with the gear 47. A ratchet wheel 69 is mounted to rotate with the pinion 68, and is preferably secured thereto. A second or resetting ratchet wheel 70 is fixedly mounted on the shaft in proximity to the ratchet wheel 69 in position to coöperate with a spring actuated pawl 71, carried by the latter, as shown in Fig. 2. Next to the ratchet wheel 70 is a pair of arms 72—73 loosely mounted on the shaft 67 each carrying at its free ends a numeral segment 77 provided on its face with the numerals from 0 to 9 inclusive and adapted to serve as item indicators and total indicators respectively. (See Fig. 7.)

A spring actuated pawl 74—75 is pivotally mounted upon the arm 72, of the total indicator, arranged to coöperate with the teeth of the ratchet wheel 69. In the preferred construction this pawl is substantially a bell crank lever in which the arm 74 is provided with a hook, arranged in the path of the teeth of the ratchet 69, while the arm 75, is extended in such a position that when the arm 72 reaches its upper limit of movement the arm 75 contacts with a stop 76 or equivalent part and operates the same, releasing the hook 74 from the ratchet tooth with which it is engaged. The stop 76 is positioned to trip the pawl at the instant the indicator is advanced beyond the numeral 9. Gravity, aided if desired by resilient means (not shown) causes the indicator to fall to the lower limit of its movement if unrestrained. The position of the ratchet wheel 69 however, may modify this movement as the pawl engages the next advancing tooth of the ratchet wheel limiting the fall of the indicator and displaying the corresponding numeral.

The item indicator may be connected to the operating mechanism in any suitable manner, so that the operation of the parts will move the indicator to indicate the particular key depressed at each operation. In the form shown, an arm 106 or other suitable means is loosely mounted intermediate its ends upon the shaft 48, and provided with a laterally projecting pin 78 or other suitable means positioned in the path of the lever 50 and with a spring actuated pawl 107 at its free end arranged to engage the gear 47 and limit the movement of the arm 106 to a distance corresponding to the movement of the gear 47. The opposite end of the arm 106 preferably extends beyond, and is circular in form concentric to, the shaft 48. The arm 73 of the item indicator is extended beyond its pivotal support upon shaft 67 as at $73^1$ and is connected by a rod 108 or suitable means to the segmental end of the arm 106, so that any movement of the arm 106 will produce a corresponding movement of the item indicator. As thus described it is evident that the movements of the item indicator will be simultaneous with the lever 50 and its associated parts including the key operated. It is however, desirable that the item indicator, should continue to indicate the last key operated, until another key of the series is depressed. Any suitable means may be provided for this purpose. In the form shown, a shaft 109 is provided substantially parallel to the shaft 48. A plurality of spring actuated brake levers 110, one for each arm 106 are mounted upon the shaft 109.

Each of the levers 110 is provided with a part $110^1$ adapted to engage the periphery of the circular portion of the arm 106 to retain the item indicator in position after the key operated, and its associated parts are released. Any suitable means may be provided for releasing the pressure of the part $110^1$ upon the arms 106 to permit the readjustment of the item indicator when another key in the section is operated. As shown, an arm 111 is mounted upon shaft 109 for each lever 110. The extremity of each arm 111 is provided with a lateral projection 113 positioned in the path of a pin 114 upon the bar 59. The several parts are so formed that when the bar 59 is moved by the operation of a key the pin 114 will engage the projection 113 and move the arm 111 backward momentarily, the pin almost immediately passing beyond the part 113 and releasing the arm. Suitable means are provided, as for example the pin 112 upon the arm 110 so positioned that when the arm 111 is moved as above described it will engage the pin and force the part $110^1$ of the lever 110 out of its engagement with the arm 106 thus releasing the same and permitting it to return by gravity, assisted if desired by resilient means not shown, to its normal position. Upon the return movement of the bar 59 the pin 114 engages the part 113 and moves the arm 111 slightly in the opposite direction without disturbing any of the other parts and permitting the pin to pass below the projection after which the arm falls by gravity to its normal position.

Any suitable means may be provided for carrying or increasing the amount indicated by any indicator, a single unit each time the indicator for the next lower order passes from 9 to 0. As shown, a shaft 79 is mounted substantially parallel to the shaft 48 opposite the shaft 109 with a pinion 80 loosely mounted thereon meshing with the large cog-wheel 47. In the form shown the pinion 68 as well as the pinion 80, is provided with 40 teeth, the former for the purpose of operating the total indicators four times at each complete rotation. The ratchet wheel 69 is for the same reason, quartered or provided with four teeth equally spaced about its periphery and the movements of the various parts are arranged to permit the cog-wheel 47 at one operation to carry the pinion 68 forward to indicate not to exceed the nine numerals within the range of a single section of keys. The pinion 80 is employed to transmit the necessary movement in carrying, as hereinafter explained. As thus explained the mechanism for the first section of keys or unit section applies to all, with the exception of key carrying mechanism for the higher orders which will now be explained. The pinion 80 carries therewith a cam 81 provided on its periphery with a cam face composed of a plurality of planes 82 and 83 which are preferably segments of circles of varying radii with the shaft as a center. This results in depressed faces 82 and raised faces 83 which are alternately brought into operative position. In the form shown, the faces are four in number, of substantially equal length, and alternating in position. Near the cam is located a rocking lever 84 pivotally supported near its center on a shaft 85. The ends of the lever 84 are constructed and positioned to be alternately engaged by the cam faces 82 and 83 giving the lever a rocking motion. As shown the lever is provided near its ends with pins 86—86 extending across the periphery of the cam 81 and loosely engaged thereby. An escapement lever 87 is arranged to be oscillated by the lever 84. As shown the two are attached together giving the free end of the escapement lever a movement corresponding, to and synchronous with the cam lever 84. The pinion 88 is loosely mounted on the shaft 79 near the cam 81, the two being connected by a spring 89 loosely coiled about the shaft with one end secured to the cam and the other to the pinion forming a resilient connection between the two. A pinion 90 loosely mounted upon a shaft meshes with the pinion 88, their engagement preventing the operation of one without the other. The pinion 88 is provided with two pins 92—92 projecting from its face in line with the end of the escapement lever 87, while the pinion 90 is similarly provided with pins 93—93. The pins on each pinion are diametrically opposite to each other, and the line of direction from pin to pin of one pinion is at right angles to that of the other. The end of the escapement lever 87 will therefore alternately engage the pins on the two pinions, thus permitting the gradual advance of the part impelled by the spring 89, which is constantly tensioned by the rotation of the driven cam 81. As clearly shown in Fig. 11, the opposite face of the pinion 90 is provided with four extending pins 94, equally spaced from each other and adapted to engage the teeth of a ratchet wheel 95 loosely mounted on the shaft 79. The ratchet wheel 95 is normally disengaged from said pins permitting the independent operation of the several parts when actuated by a key of that section. When the pinion 90 is rotated, however, one of the said pins 94 engages a ratchet tooth and the ratchet wheel and its associated parts including the indicator 72 and the carrying pinion 80 of that section are advanced one interval. Thus also the gradual advance of the pinion 90 will be communicated to the ratchet wheel 95 which is mounted upon a sleeve 96, upon which is also mounted the pinion 80¹ and the cam 81¹ transmitting movement to the next higher order. The pinion 80¹ meshing with the main gear 47 of its section and together with the cam 81¹, correspond in construction, arrangement and operation to the pinion 80 and cam 81 heretofore described. Obviously in the units section the ratchet wheel 95 is not employed, as that mechanism receives no impulses from a lower order, corresponding to the carrying operation of the higher orders. In all the sections except the first therefore, a ratchet wheel 95, pinion 80¹ and cam 81¹ are mounted to rotate together, and are driven by engagement of a pinion 90 with the ratchet wheel as described, while the connection between the cam 81 or 81¹ as the case may be, with the pinion 88 of the next section is of a resilient nature.

In a device of this kind it is found desirable to slightly retard the carrying operation, until the operative parts of the higher order have substantially completed any forward movement they may have received from the simultaneous operation of a key of that order. In fact such action is sometimes essential in order to secure accuracy, as, where keys in adjacent sections are operated simultaneously, the carrying impulse is liable to be nullified by the simultaneously moving parts of the higher order without registering the carrying impulse. Any preferred means may be employed for this purpose. In the form shown in the drawings each of the numerical orders above the units is provided with a two part pawl 99—100, in which the part 99 has a movement in the plane of the pinion 88 in such a manner that its free end may engage the teeth of the pinion and temporarily prevent its rotation. The part 100 depends from a loose pivotal support 101 with its free end in line with a projection 102 upon a sliding link 103 attached to and operated by the arm 59 already described. As shown, the link is pivotally attached to the arm as at 104. The free end of the link is supported by a slot and pin connection as shown in Fig. 10. The parts 99 and 100 of the pawl have a limited movement upon one another so that during the initiatory movement of the link 103 the projection 102, which is simply an elevated portion of the link, contacts with the free end of the part 100 and swings the same the limited movement permitted before the part 99 is actuated to engage the periphery of the pinion 88. As the link completes its stroke the rear of the projection 102 passes the end of the part 100 permitting the same to drop downward. The resilient tendency of the pinion 88 to rotate to actuate the carrying mechanism when not restrained by the escapement holds the pinion in engagement with the pawl until the reverse movement of the link 103 causes the projection 102 to contact with the opposite side of the part 100 and swing the same in the reverse direction. The engagement of the pawl 99 with the pinion 88 is maintained until the part 100 reaches its limit of movement on the part 99, at which point continued movement of the link 103 positively disconnects said parts and permits the carrying impulse to actuate the mechanism of the next higher order to advance its indicator one interval as described. While the pinion 88 is locked against rotation, however, the impulse caused by the operation of any key in the higher order, has been transmitted to the several parts and their operations fully completed before the pinion 88 is released and is free to perform its functions.

Obviously in a device of this character it is desirable to provide means for resetting the item indicators after each operation of the keys so that they may accurately indicate the keys operated and no other, that is for example. In case a key in each of the first four series of keys at the right of the key board is operated, and without resetting the indicators a key in each of the first two rows should be depressed at the next operation, it is obvious that of the four indicators previously operated the two left hand indicators would continue to indicate the keys depressed at the first operation while the two right hand indicators would indicate those depressed at the second operation thus tending to cause confusion. It is also obvious that it is desirable to provide means for simultaneously setting both the item indicators and the total indicators before commencing a new series of operations with the device. Any suitable form of resetting mechanism may be provided. In the form shown, the shaft 109 is provided with a V shaped groove or depression 115 extending the entire length of the space occupied by the arms 110. Each of the arms 110 is provided with a part 116 extending into the groove and partially filling the same laterally, so that the arms may each be operated to engage or release the arm 106 as above described, during the normal operations of the machine without rotating the shaft 109. An arm 117 is rigidly attached to the shaft 109 with its free end extending horizontally. A resetting key 118 is provided upon the keyboard of the machine upon the stem of which a pin or projection 119 is provided, arranged to engage the lever 117 when the key is depressed and rotate the shaft 109 sufficiently to cause the wall of the groove 115 to engage the projections 116 and simultaneously raise the free ends of all of the brake levers 110 thus releasing the item indicators and permitting them to fall to the lower limit of their movement as above described. Any suitable means may also be provided for resetting the total indicators and if desired resetting the item indicators at the same time. In the form shown the end of the shaft 67 protrudes from one side of the frame and is provided with a nob 98 or equivalent means by which the shaft may be rotated manually thus actuating the several ratchet wheels 70 alined thereon. The rotation of the ratchet wheels 70 engages the pawls 71 and thereby rotates the ratchet wheels 69 alining the several indicators and carrying the same upward until released when they all fall to their lowest limit of movement, each indicating zero.

In the preferred construction shown a cam wheel 120 is mounted upon the shaft 67 in position to engage a pin or other suitable means 122 near the extremity of an arm 121 rigidly mounted upon the shaft 109. The periphery of the cam wheel 120 is preferably divided into equal faces or sections corresponding in position and number to the teeth upon the ratchet wheel 69 and so proportioned that when the shaft is rotated as above described each face will engage the pin 122 and move the free end of the arm 121 sufficiently to rotate the shaft 109 and release the several item indicators as above described. The releasing of the item indicators by this arrangement takes place almost simultaneously with the final release of the total indicators as above described.

Obviously if the faces of all the indicators were simultaneously exposed considerable confusion would inevitably result and, for this reason suitable means are preferably provided for exposing only one series of indicators at a time, that is, for exposing the item indicators, or the total indicators, as may be desired, and concealing the remaining indicators. Any suitable means may be provided for this purpose, in the form shown, a longitudinally movable slide 124 is arranged in the upper face of the casing, and a plurality of apertures 125 are provided in the slide, comprising an aperture for each series of keys suitably spaced to simultaneously expose all of the indicators of a series while concealing all of the other indicators. As both series of indicators are similarly spaced, by moving the slide 124 longitudinally the width of the face of a segment 77 the indicators previously concealed will be exposed and those previously exposed will be concealed.

In the foregoing the general operating mechanism of my device is, in all respects substantially the same as that shown and described in my pending application for United States Letters Patent for a computing machine, filed January 11, 1906, Serial No. 295,670. The present invention provides means for particularly indicating the various keys depressed at each operation and associated parts for conveniently applying such indicators to the device. It is therefore obvious that the general operating mechanism described in the present application may be altered as desired, that is, item indicators similar to those herein described, may be applied to various forms of calculating machines without departing from the spirit of the present invention as I do not wish to be understood as limiting myself to the particular form of operating machine shown.

Having thus described my invention what I claim as new, and desire to secure by Letters Patent is:

1. In a device of the kind described, a plurality of series of keys, a shaft, and a plurality of substantially independent oscillating indicators for each series, mounted on said shaft, in combination with intermediate mechanism between the keys and the indicators, whereby the movement of the keys is transmitted to and actuates the indicators.

2. In a device of the kind described, a plurality of series of keys, a plurality of substantially independent and coincidently operated indicators for each series a rock arm support for the indicators and adapted to swing or oscillate the indicators, in combination with intermediate mechanism between the keys and the rock arm supports, whereby the movement of the keys is transmitted to and actuates the indicators.

3. In a device of the kind described, a plurality of series of keys, a shaft, a plurality of substantially independent segmental shaped oscillating indicators for each series, mounted on said shaft, and means for operating one of said indicators for each series as an item indicator, and another as another indicator, in combination with intermediate mechanism between the keys and the indicators, whereby the movement of the keys is transmitted to and actuates the indicators.

4. In a device of the kind described, a plurality of series of keys, a shaft, a plurality of substantially independent indicators for each series mounted upon said shaft, means mounted upon the shaft for operating one of said indicators, a substantially parallel shaft, and means mounted upon said second shaft and connected to an indicator on the first shaft for operating the same, in combination with intermediate mechanism between the keys and the indicators, whereby the movement of the keys is transmitted to and actuates the indicators.

5. In a device of the kind described, a plurality of series of keys, a shaft, and a plurality of substantially independent and independently operated indicators for each series mounted upon said shaft, means mounted upon the shaft for operating one of said indicators, an adjacent shaft, and means mounted upon said adjacent shaft and connected to an indicator on said first mentioned shaft for operating the same, in combination with intermediate mechanism between the keys and the indicators, whereby the movement of the keys is transmitted to and actuates the indicators.

6. In a device of the kind described, a plurality of series of keys, a shaft, and a plurality of substantially independent and independently operated indicators for each series mounted upon said shaft, means mounted upon the shaft for operating one of said indicators of each series, an adjacent shaft, and means mounted upon said second shaft and connected to another indicator of each series for operating same, in combination with intermediate mechanism between the keys and the indicators, whereby the movement of the keys is transmitted to and actuates the indicators.

7. In a device of the kind described, a plurality of series of keys, a shaft, and a plurality of substantially independent indicators for each series mounted upon said shaft, and means mounted upon said shaft for operating one of the indicators of each series, a second shaft adjacent to the first, and means mounted upon said second shaft and connected to another indicator of each series for operating another series of indicators, in combination with intermediate mechanism between the keys and the indicators, whereby the movement of the keys is transmitted to and actuates the indicators.

8. In a device of the kind described, a plurality of series of keys, a shaft, and a plurality of substantially independent and independently operated indicators for each series, mounted upon said shaft, means mounted upon the shaft for operating one of the indicators of each series, a support, and means mounted upon said support and connected to an indicator of each series for operating another series of indicators, in combination with intermediate mechanism between the keys and the indicators, whereby the movement of the keys is transmitted to and actuates the indicators.

9. In a device of the kind described, a series of keys, a shaft, and a pair of substantially independent indicators for each series, mounted upon said shaft, means mounted upon the shaft for operating one of the indicators of each series, a supporting member independent of said shaft, and means mounted upon said supporting member and connected to the other indicators of each series for operating same, in combination with intermediate mechanism between the keys and the indicators, whereby the movement of the keys is transmitted to and actuates the indicators.

10. In a device of the kind described, a plurality of series of keys, a shaft, and a pair of substantially independent indicators for each series, arms upon which the indicators are mounted for oscillating movement therewith, the arms being mounted upon said shaft, and means for operating one of said indicators of each series as one indicator and the other as another indicator, in combination with intermediate mechanism between the keys and the indicators, whereby the movement of the keys is transmitted to and actuates the indicators.

11. In a device of the kind described, a plurality of series of keys, and an oscillating segmental item indicator for each series, adapted to indicate the particular key operated, in combination with intermediate mechanism between the keys and the indicators, whereby the movement of the keys is transmitted to and actuates the indicators.

12. In a device of the kind described, a plurality of series of keys, and an independent oscillating segmental item indicator for each series adapted to indicate the particular key operated, in combination with intermediate mechanism between the keys and the indicators, whereby the movement of the keys is transmitted to and actuates the indicators.

13. In a device of the kind described, a plurality of series of keys, a segmental shaped item indicator for each series, adapted to indicate the particular key operated, a rock arm for the indicators, and means temporarily inactive during the movement of any of said keys, adapted to hold each item indicator in the indicating position until a key in that particular series is again operated, means for controlling the last mentioned means in combination with intermediate mechanism between the keys and the indicators, whereby the movement of the keys is transmitted to and actuates the indicators.

14. In a device of the kind described, a plurality of series of keys, and an item indicator for each series, adapted to indicate the particular key operated, a brake adapted to engage and frictionally hold each item indicator in its indicating position until a key of that particular series is again operated, controlling means for the brake in combination with intermediate mechanism between the keys and the indicators, whereby the movement of the keys is transmitted to and actuates the indicator.

15. In a device of the kind described, a plurality of series of keys, and an item indicator for each series, adapted to indicate the particular key operated, a brake arranged to engage and frictionally hold each item indicator in its indicating position until another key in the series is operated, means whereby the brake is released and means for simultaneously releasing all of said item indicators, in combination with intermediate mechanism between the keys and the indicators, whereby the movement of the keys is transmitted to and actuates the indicators.

16. In a device of the kind described, a plurality of series of keys, and an item indicator for each series, adapted to indicate the particular key operated, a brake adapted to engage and frictionally hold each item indicator in its indicating position until another key in the series is operated, and means controlled by an independent key for simultaneously releasing all of said item indicators, in combination with intermediate mechanism between the keys and the indicators, whereby the movement of the keys is transmitted to and actuates the indicators.

17. In a device of the kind described, a plurality of series of keys, an independent item indicator for each series, adapted to indicate the particular key operated, means adapted to hold each item indicator in its indicating position until a key of that series is again operated, means whereby the said means is released in a subsequent operation, in combination with intermediate mechanism between the keys and the indicators, whereby the movement of the keys is transmitted to and actuates the indicators.

18. In a device of the kind described, a plurality of series of keys, and an independent item indicator for each series, adapted to indicate the particular key operated, and a brake adapted to engage and frictionally hold each item indicator in its indicating position, said brake being releasable by a subsequent operation of a key of that particular series, in combination with intermediate mechanism between the keys and the indicators, whereby the movement of the keys is transmitted to and actuates the indicators.

19. In a device of the kind described, a plurality of series of keys, and an independent item indicator for each series, adapted to indicate the particular key operated, releasable means operating to engage and frictionally hold each item indicator in its indicating position until another key of the series is operated, and means for simultaneously releasing all of said item indicators, in combination with intermediate mechanism between the keys and the indicators, whereby the movement of the keys is transmitted to and actuates the indicators.

20. In a device of the kind described, a plurality of series of keys, and an independent item indicator for each series, adapted to indicate the particular key operated, a brake, adapted to engage and frictionally hold each item indicator in its indicating position until another key of the series is operated, and means controlled by an independent key for simultaneously releasing all of said item indicators, in combination with intermediate mechanism between the keys and the indicators, whereby the movement of the keys is transmitted to and actuates the indicators.

21. In a device of the kind described, a plurality of series of keys, and a plurality of series of indicators, comprising a plurality of segmental indicators for each series of keys, oscillating arm supports for the indicators, in combination with intermediate mechanism between the indicators and keys for operating all of the indicators of a series of keys whenever any key of a series is operated.

22. In a device of the kind described, a plurality of series of keys, and a plurality of series of indicators, comprising a plurality of substantially independent oscillating indicators for each series of keys, in combination with intermediate mechanism between the indicators and keys for operating all of the indicators of a series of keys whenever a key of the series is operated.

23. In a device of the kind described, a plurality of series of keys, and a plurality of series of oscillating indicators, comprising a plurality of indicators for each series of keys, consisting of indicators adapted to indicate items and other indicators adapted to indicate additional data, in combination with substantially independent intermediate mechanism between the indicators and keys for operating all the indicators of a series of keys when a key in the series is operated.

24. In a device of the kind described, a plurality of series of keys, and a plurality of indicators, comprising a plurality of indicators for each series of keys, in combination with intermediate mechanism between the indicators and keys for operating all of the indicators of a series of keys whenever any key in the series is operated, and friction holding means adapted to retain each indicator of one series in its indicating position until another key of the series is operated.

25. In a device of the kind described, a plurality of series of keys, and a plurality of series of indicators, comprising a plurality of segmental oscillating indicators for each series of keys, in combination with intermediate mechanism between the indicators and keys for operating all of the indicators of a series of keys whenever any key in the series is operated, means adapted to retain one of the indicators for each series in its indicating position until another key of the series is operated, and means for simultaneously releasing all of the indicators so retained.

26. In a device of the kind described, a plurality of series of keys, and a plurality of series of indicators, comprising a plurality of indicators for each series of keys, in combination with intermediate mechanism between the indicators and keys for operating all of the indicators for a series of keys whenever any key in the series is operated, means adapted to frictionally retain a portion of said indicators in their indicating position until another key of the series is operated, and means controlled by an independent key for simultaneously releasing all of the indicators so retained.

27. In a device of the kind described, a plurality of series of keys, and a plurality of series of indicators, comprising a plurality of segmental oscillating indicators for each series of keys, in combination with intermediate mechanism between the indicators and keys for operating all of the indicators of a series whenever any key in the series is operated, and retaining the same in such position, and means for simultaneously releasing all of said indicators.

28. In a device of the kind described, a plurality of series of keys, a plurality of substantially independent segmental shaped oscillating indicators of keys, for each series, in combination with substantially independent intermediate mechanism between the indicators and keys for operating all of the indicators of a series of keys whenever any key in the series is operated.

29. In a device of the kind described, a plurality of series of keys, and a plurality of series of indicators, comprising a plurality of substantially independent indicators for each series of keys, in combination with intermediate mechanism between the indicators and keys for operating all of the indicators of a series of keys whenever any key of a series is operated, and pivoted friction holding releasable means adapted to retain each item indicator in its indicating position until another key of the series is operated.

30. In a device of the kind described, a plurality of series of keys, and a plurality of series of indicators, comprising a plurality of substantially independent indicators for each series of keys, in combination with intermediate mechanism between the indicators and keys for operating all of the indicators of a series of keys whenever any key of the series is operated, a pivoted friction holding means operating to retain each item indicator in its indicating position until another key in the series is operated, and means for simultaneously releasing all of said item indicators.

31. In a device of the kind described, a plurality of series of keys, and a plurality of series of indicators, comprising a plurality of substantially independent segmental shaped oscillating indicators for each series of keys, consisting of an item indicator and another indicator, in combination with intermediate mechanism between the indicators and keys for operating all of the indicators of a series of keys whenever a key in the series is operated, means adapted to retain each item indicator in its indicating position until another key of the series is operated, and means controlled by an independent key for simultaneously releasing all of said item indicators.

32. In a device of the kind described, a plurality of series of keys, and a plurality of series of indicators, comprising a plurality of substantially independent segmental shaped oscillating indicators for each series of keys, consisting of an item indicator and another indicator, in combination with intermediate mechanism between the indicators and keys for operating all of the indicators for a series of keys whenever any key of the series is operated, and means for resetting all of said indicators.

33. In a device of the kind described, a plurality of series of keys, and a plurality of series of indicators, comprising a plurality of substantially independent segmental shaped oscillating indicators for each series of keys, consisting of an item indicator and another indicator, in combination with intermediate mechanism between the indicators and keys for operating all of the indicators of a series of keys whenever a key in the series is operated, means adapted to retain each item indicator in its indicating position until another key of the series is operated, and means for simultaneously releasing all of said item indicators and re-setting all of said other indicators.

34. In a device of the kind described, a plurality of series of keys, and a plurality of series of indicators, comprising a plurality of indicators for each series of keys, in combination with intermediate mechanism between the indicators and keys for operating all of the indicators of a series of keys whenever a key in the series is operated, a pivoted friction brake adapted to retain an indicator for each series of keys in its indicating position until another key of the series is operated, and means for simultaneously re-setting all of said indicators.

35. In a device of the kind described, a plurality of series of keys, and a plurality of series of indicators, comprising an item indicator and an another indicator for each series of keys, in combination with intermediate mechanism between the indicators and keys for operating all of the indicators of a series of keys whenever any key in the series is operated, means for retaining the indicators in such position, and a friction brake for simultaneously releasing all of the indicators to re-set the same.

36. In a device of the kind described, a plurality of series of keys, and a plurality of series of indicators, comprising a plurality of substantially independent segmental indicators for each series of keys, elongated rock arm supports for the indicators, in combination with intermediate mechanism between the indicators and keys for operating all the indicators of a series of keys whenever any key in the series is operated, means for retaining the indicators in their indicating position, and means for simultaneously releasing all of said indicators to re-set the same.

37. In a device of the kind described, a plurality of series of keys, a shaft, and a plurality of series of oscillating indicators, mounted upon said shaft, comprising a plurality of separate indicators for each series of keys, in combination with means for coincidently exposing a part of each of the indicators of a single series only, and means for adjusting the mechanism to expose any series of indicators desired.

38. In a device of the kind described, a series of controlling keys, a shaft, and a pair of substantially independent indicators for each series, mounted upon said shaft, means mounted upon the shaft for operating one of the indicators of each series, a second shaft, and means mounted upon said second shaft and connected to the other indicator of each series for operating the same, in combination with actuating mechanism controlled by the keys for actuating the indicators.

39. In a device of the kind described, a plurality of series of controlling keys, a shaft, a pair of substantially independent oscillating indicators for each series, mounted upon said shaft, and means for operating one of the indicators of each series as an item indicator, and the other as another indicator, in combination with actuating mechanism controlled by the keys for actuating the indicators.

40. In a device of the kind described, a plurality of series of controlling keys, and an item indicator for each series, adapted to indicate the particular key operated, a brake adapted to engage and frictionally hold each item indicator in its indicating position until a key of that particular series is again operated, in combination with actuating means controlled by the keys for operating said indicators and for releasing said brake.

41. In a device of the kind described, a plurality of series of controlling keys, and an item indicator for each series, adapted to indicate the particular key operated, a brake, adapted to engage and frictionally hold each item indicator in its indicating position until another key of the series is operated, and means controlled by the keys for simultaneously releasing all of said item indicators, in combination with actuating mechanism controlled by the keys for operating said indicators.

42. In a device of the kind described, a plurality of series of controlling keys, and an item indicator for each series, adapted to indicate the particular key operated, friction holding means adapted to hold each item indicator in its indicating position until another key in the series is operated, said means being releasable by the operation of said other key and means controlled by an independent key for simultaneously releasing all of said item indicators, in combination with actuating means controlled by the means for operating said indicators.

In testimony whereof, I have hereunto signed my name in the presence of two subscribing witnesses.

DANIEL W. SHIEK.

Witnesses:
 CASSIUS C. SHIRLEY,
 BESS M. RUBUSH.

Copies of this patent may be obtained for five cents each, by addressing the "Commissioner of Patents, Washington, D. C."